(12) United States Patent
Parkes et al.

(10) Patent No.: US 9,663,028 B2
(45) Date of Patent: May 30, 2017

(54) METHOD AND SYSTEM FOR RENDERING CONTENT ON THE EXTERIOR OF A VEHICLE

(71) Applicants: Frederick Hayle Parkes, Baldwin, NY (US); Neville Boston, San Jose, CA (US)

(72) Inventors: Frederick Hayle Parkes, Baldwin, NY (US); Neville Boston, San Jose, CA (US)

(*) Notice: Subject to any disclaimer, the term of this patent is extended or adjusted under 35 U.S.C. 154(b) by 0 days.

(21) Appl. No.: 14/684,971

(22) Filed: Apr. 13, 2015

(65) Prior Publication Data

US 2015/0283939 A1    Oct. 8, 2015

Related U.S. Application Data

(63) Continuation-in-part of application No. 13/117,093, filed on May 26, 2011, now Pat. No. 9,007,193.

(60) Provisional application No. 61/349,173, filed on May 27, 2010, provisional application No. 62/141,548, filed on Apr. 1, 2015.

(51) Int. Cl.
| | | |
|---|---|---|
| B60Q 1/00 | (2006.01) | |
| B60Q 1/50 | (2006.01) | |
| G08B 5/36 | (2006.01) | |
| G09F 21/04 | (2006.01) | |
| G08G 1/017 | (2006.01) | |
| G08G 1/052 | (2006.01) | |
| B60R 13/10 | (2006.01) | |
| G07C 5/00 | (2006.01) | |

(52) U.S. Cl.
CPC .............. *B60Q 1/503* (2013.01); *G08B 5/36* (2013.01); *G08G 1/017* (2013.01); *G08G 1/052* (2013.01); *G09F 21/04* (2013.01); *B60R 13/10* (2013.01); *G07C 5/008* (2013.01)

(58) Field of Classification Search
CPC ........ G08G 1/017; G08G 1/052; G09F 21/04; B60Q 1/503; G08B 5/36
USPC ...... 340/425.5, 463, 466, 691.6, 815.4, 468, 340/905; 705/14.62–14.64
See application file for complete search history.

(56) References Cited

U.S. PATENT DOCUMENTS

| | | |
|---|---|---|
| 4,001,822 A | 1/1977 | Sterzer |
| 4,928,084 A | 5/1990 | Reiser |
| 5,105,179 A | 4/1992 | Smith |
| 5,132,666 A | 7/1992 | Fahs |
| 5,396,233 A | 3/1995 | Hofmann |

(Continued)

*Primary Examiner* — Thomas Mullen (57) ABSTRACT

One embodiment induces a display system for use on the exterior of a vehicle having a display, a vehicle speed sensor, a trigger device, and a processor coupled to the speed sensor and the trigger device. The trigger device is configured to identify a trigger event. The processor is configured to implement one of four operational modes of the display system based on the speed and state of the vehicle: a first operational mode when no trigger event is identified, the vehicle is on, and the vehicle is at a first speed; a second operational mode when no trigger event is identified and the vehicle is at a second speed different than the first speed; a third operational mode when the trigger event is identified, and a fourth operational mode in which content is displayed at a second power consumption level less than the first power consumption level. The processor is further configured to render content on the display based upon the operational mode.

13 Claims, 3 Drawing Sheets

FIRST MODE (56) References Cited

U.S. PATENT DOCUMENTS

| | | |
|---|---|---|
| 5,422,624 A | 6/1995 | Smith |
| 5,533,045 A | 7/1996 | Hasegawa et al. |
| 5,608,391 A | 3/1997 | Bantli et al. |
| 5,621,571 A | 4/1997 | Bantli et al. |
| 5,627,549 A | 5/1997 | Park |
| 5,657,008 A | 8/1997 | Bantli |
| 5,717,374 A | 2/1998 | Smith |
| 5,747,938 A | 5/1998 | Beard |
| 5,873,068 A | 2/1999 | Beaumont et al. |
| 5,937,392 A | 8/1999 | Alberts |
| 5,963,129 A | 10/1999 | Warner |
| 6,026,060 A | 2/2000 | Rothschild et al. |
| 6,052,068 A | 4/2000 | Price R-W et al. |
| 6,067,008 A | 5/2000 | Smith |
| 6,108,954 A | 8/2000 | Eiteneer et al. |
| 6,239,757 B1 | 5/2001 | Ishikawa et al. |
| 6,253,143 B1 | 6/2001 | Silvernagle et al. |
| 6,404,327 B1 * | 6/2002 | Naddeo ............... B60R 13/10 340/426.11 |
| 6,553,131 B1 | 4/2003 | Neubauer et al. |
| 6,608,556 B2 | 8/2003 | De Moerloose et al. |
| 6,641,038 B2 | 11/2003 | Gehlot et al. |
| 6,701,143 B1 | 3/2004 | Dukach et al. |
| 6,731,238 B2 | 5/2004 | Johnson |
| 6,741,920 B1 | 5/2004 | Otto |
| 6,812,851 B1 | 11/2004 | Dukach et al. |
| 6,850,209 B2 | 2/2005 | Mankins et al. |
| 6,864,784 B1 | 3/2005 | Loeb |
| 6,866,191 B2 | 3/2005 | Messina |
| 6,914,540 B2 | 7/2005 | Gongolas |
| 6,922,138 B2 | 7/2005 | Melvin |
| 7,027,772 B2 | 4/2006 | Chen et al. |
| 7,076,244 B2 | 7/2006 | Lazaridis et al. |
| 7,096,102 B1 | 8/2006 | Parker, Sr. |
| 7,142,104 B1 | 11/2006 | Blueford |
| 7,154,383 B2 | 12/2006 | Berquist |
| 7,161,563 B2 | 1/2007 | Vitale et al. |
| 7,319,379 B1 | 1/2008 | Melvin |
| 7,426,480 B2 | 9/2008 | Granger et al. |
| 7,430,822 B1 | 10/2008 | Combs |
| 7,449,998 B1 | 11/2008 | Au et al. |
| 7,466,241 B2 | 12/2008 | Lyle et al. |
| 7,478,492 B2 | 1/2009 | Madonia |
| 7,482,910 B2 | 1/2009 | Melvin |
| 7,536,189 B2 | 5/2009 | Himmelstein |
| 7,551,088 B2 | 6/2009 | Findlay et al. |
| 7,565,141 B2 | 7/2009 | Macaluso |
| 7,595,740 B2 | 9/2009 | Pechenick et al. |
| 7,696,864 B2 | 4/2010 | Dillon |
| 8,188,850 B2 * | 5/2012 | Smith ............... B60Q 1/50 340/425.5 |
| 9,007,193 B2 | 4/2015 | Boston et al. |
| 2001/0001319 A1 | 5/2001 | Beckert et al. |
| 2002/0021210 A1 | 2/2002 | Naddeo |
| 2002/0097193 A1 | 7/2002 | Powers |
| 2003/0034934 A1 | 2/2003 | Brewer |
| 2003/0140536 A1 | 7/2003 | Bilyeu |
| 2003/0142044 A1 | 7/2003 | Berry |
| 2004/0021579 A1 | 2/2004 | Oursler et al. |
| 2004/0128891 A1 | 7/2004 | Keach |
| 2004/0230480 A1 | 11/2004 | Kanayama |
| 2006/0142933 A1 | 6/2006 | Feng |
| 2006/0213100 A1 | 9/2006 | McCann |
| 2006/0227010 A1 | 10/2006 | Berstis et al. |
| 2007/0008084 A1 | 1/2007 | Wu et al. |
| 2007/0038353 A1 | 2/2007 | Larschan et al. |
| 2007/0046499 A1 | 3/2007 | McKenna |
| 2007/0285361 A1 | 12/2007 | Jovanovich |
| 2008/0059299 A1 | 3/2008 | Hamoui |
| 2008/0258938 A1 | 10/2008 | Moon |
| 2009/0299857 A1 | 12/2009 | Brubaker |
| 2010/0259058 A1 * | 10/2010 | Knighton ............... B60L 8/003 705/14.49 |
| 2010/0286906 A1 | 11/2010 | Nogawa et al. |
| 2011/0078933 A1 | 4/2011 | Lukawitz et al. |
| 2011/0291822 A1 | 12/2011 | Boston et al. |
| 2011/0295697 A1 | 12/2011 | Boston et al. |
| 2012/0303458 A1 | 11/2012 | Schuler, Jr. |
| 2013/0006775 A1 | 1/2013 | Jordan et al. |

* cited by examiner

FIG. 1
FIRST MODE

FIG. 2
SECOND MODE

FIG. 3
THIRD MODE

FIG. 4
FOURTH MODE

*Figure 5*

METHOD AND SYSTEM FOR RENDERING CONTENT ON THE EXTERIOR OF A VEHICLE

CROSS-REFERENCE TO RELATED APPLICATIONS

This application is a continuation-in-part of U.S. application Ser. No. 13/117,093 filed on May 26, 2011 (U.S. Pat. No. 9,007,193 issued on Apr. 14, 2015) and incorporated herein by reference in its entirety. This application also claims the benefit of U.S. provisional application Ser. No. 61/349,173 filed on May 27, 2010 and incorporated herein by reference in its entirety, and U.S. provisional application Ser. No. 62/141,548 filed on Apr. 1, 2015 an incorporated herein by reference in its entirety.

TECHNICAL FIELD

This invention relates generally to the display field, and more specifically to a new and useful method and system for rendering content on the exterior of a vehicle.

BACKGROUND

Upon registering a vehicle, the owner of a vehicle is typically issued a license plate that displays the vehicle identification and registration information. The owner of the vehicle, law enforcement, or any other suitable party may use the displayed vehicle information to identify the vehicle. However, because license plates are typically metal sheets with the desired identification and registration information formed into the sheet, updating the displayed information requires issuing a new license plate. Though the older plate may be recycled, significant manufacturing procedures must be used to reform the older plate to include updated identification and registration information and to be used again as a license plate. Thus, typical license plates include only information that is substantially permanent regarding the vehicle. For example, in the State of California, the registration number (or license number) of the vehicle is formed into the license plate while registration dates and years are displayed using stickers. Each year, when the registration of the vehicle is renewed, a new sticker is mailed or provided to the owner of the vehicle to replace the older sticker, which may serve as an inconvenience to the owner of the vehicle. Additionally, because of the replaceable nature of the stickers, stickers are removable from the license plate, which may allow for stickers to be stolen or to detach pre-maturely, which leads to the loss of relatively important information regarding the vehicle.

Vehicle identification and registration information may be displayed, or "rendered", on a dynamic display arranged on the exterior of a vehicle rather than a static license plate. Dynamic displays may also allow for additional information to be rendered on the exterior of a vehicle. However, arranging a typical dynamic display on the exterior of the vehicle does not necessarily provide the same functionality as a static license plate. Thus, there is a need in the dynamic display field to create a new and useful vehicle identification and registration information display that addresses providing at least the same functionality that static license plates provide while potentially displaying additional information and providing improved updateability of vehicle identification and registration information.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
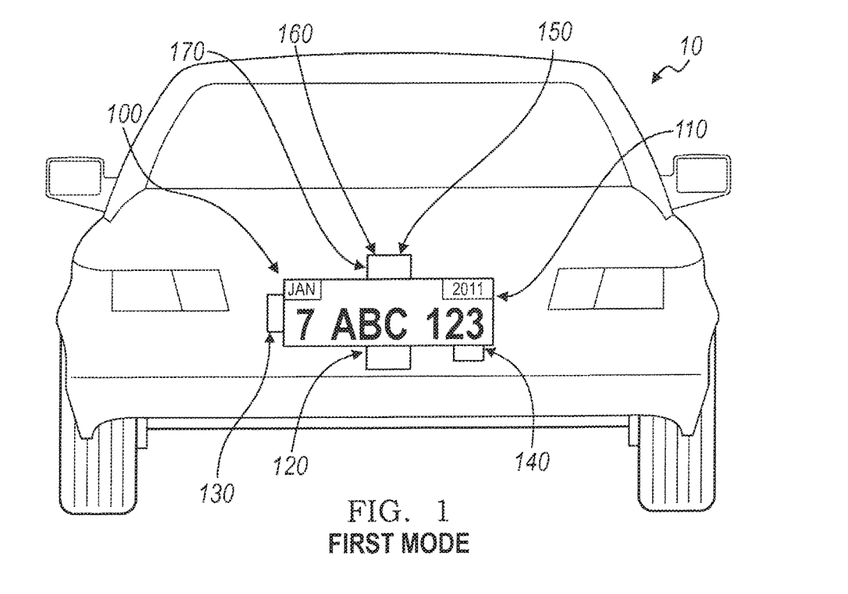
FIGS. 1 and 2 are schematic representations of the display system operating in a first operational mode and a second operational mode, respectively.
Figure 2:
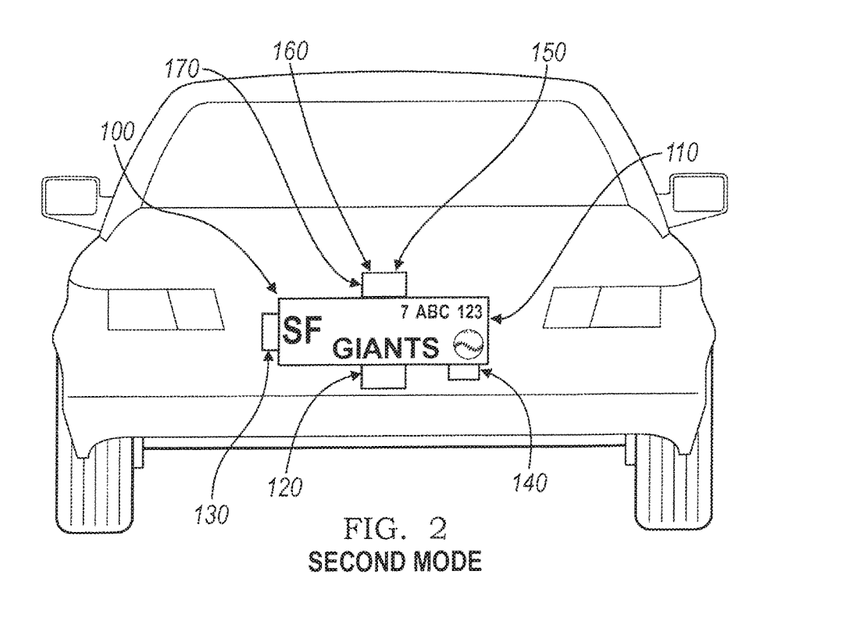
Figure 3:
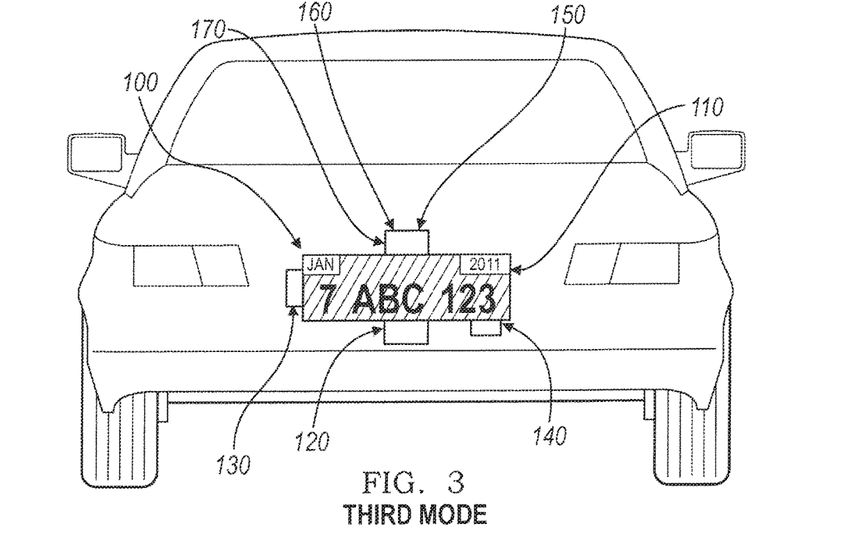
FIG. 3 is a schematic representation of the display system in an exemplary usage scenario of the third mode.

As shown in FIGS. 1-3, the display system 100 for use on the exterior of a vehicle 10 includes a display 110, a vehicle speed sensor 120, and a processor 130 coupled to the vehicle speed sensor 120. The processor 130 is configured to implement one of four operational modes of the display system 100 based on the state of the vehicle, the speed of the vehicle 10, and the identification of a trigger event: a first operational mode, wherein a first content, including identification information of the vehicle 10 and/or registration information of the vehicle 10 is rendered on the display 110 at a first power consumption level (shown in FIG. 1); a second operational mode, wherein a second content, including a message, identification information of the vehicle 10, and/or registration information of the vehicle 10, is rendered on the display 110 (shown in FIG. 2); and a third operational mode, wherein a third content, including identification information of the vehicle 10 and/or identification information of the driver of the vehicle 10, is rendered on the display 110 when a trigger event is identified (such as when a trigger signal is sensed) (shown in FIG. 3). Preferably, the processor also implements a fourth operational mode, wherein content is rendered on the display at a second power consumption level less than the first power consumption level. The third operational mode functions to allow a party outside of the vehicle (for example, a law enforcement officer or an official facility) to trigger the display of vehicle and/or driver information at any desired time. In other words, the processor 130 is preferably configured to transition into the third operational mode when a trigger event is identified. Preferably, the processor 130 may be configured to transition into the third operational mode from only the fourth mode. Alternatively, the processor 130 may be configured to transition into the third mode from any other suitable mode or combination of modes. The content displayed in the third operational mode may be substantially similar to the content displayed in the first mode, but may alternatively be different, for example, the content displayed in the first operational mode may include the license number of the vehicle 10 and the registration expiration date of the vehicle 10 while the content displayed in the third operational mode may include the license number of the vehicle 10 and official driving record of the driver of the vehicle 10.

The display system 100 preferably also includes a communication device 140 that allows content (for example, updated identification information, registration information, and/or messages) to be transferred to and from the display system 100. The display system 100 preferably also includes a trigger device 170 that allows the display system 100 to identify a trigger event, preferably by receiving a trigger signal, and then activate the third mode. The trigger device 170 may be included in the communication device 140, but may alternatively be separate or any other suitable arrangement. The display system 100 may also include a location sensor 160, for example, a Global Positioning System (GPS) device, a cellular tower location triangulation device, or any other suitable location sensor that determines the location of the vehicle to on which the display 110 is arranged. The location sensor 160 may provide a substantially general location or a substantially exact location of the vehicle. Additionally, the display system 100 may include a storage device 150 that functions to store content; the processor 130 may retrieve content from the storage device 150 and render it on the display 110.

The display system 100 is preferably used for registered vehicles such as personal cars, trucks, motorcycles, rental cars, corporately-owned cars, or any other suitable type of vehicle. The display system 100 functions to render identification and/or registration information of the vehicle 100 that is preferably provided by an official authority, such as a Department of Motor Vehicles (DMV). Preferably, the processor 120 renders the identification and/or registration information of the vehicle 10 on the display 110 such that a state vehicle code is followed, such as the size and dimension of the displayed area, the content, size, and lettering style of the information, and the visibility and reflectivity of the display 110. Preferably, the processor 120 renders content on the display 110 such that the state vehicle code of the state in which the vehicle 100 is registered is followed; alternatively, such as in the embodiment of the invention that incorporates a location sensor (such as a GPS device), the processor 120 may render content on the display 110 such that the state vehicle code of the state in which the vehicle is located is followed. The display system 100 preferably functions to display a message in addition to the vehicle identification and/or registration information. The message is preferably provided by an advertiser, for example, an advertiser that is substantially unrelated to the user. The subject matter of the advertisement provided by the advertiser may be substantially unrelated to the driver and/or owner of the vehicle 10, and the advertisement may be substantially unrelated to the vehicle 10. Alternatively, the advertisement may be related to a demographic to which the driver and/or owner of the vehicle 10 belongs or to any other suitable characteristic of the driver and/or owner of the vehicle to. The advertisement may also be selectable by the driver and/or owner of the vehicle to, for example, via the Internet on a personal computer, via the internet on an internet-capable mobile phone, or via any other suitable method. The advertisement may also be substantially related to the vehicle to, for example, a display system mounted to a Porsche may display advertisements that are targeted at a demographic with a brand affinity toward Porsches. The advertisements may be substantially related to the location of the vehicle 10, for example, if the vehicle 100 is traveling within the vicinity of a venue, an advertisement for the venue may be shown. Alternatively, the message may be provided by a law enforcement agency, for example, an emergency broadcast regarding a missing person (for example, an Amber or an Elder alert). Furthermore, if the vehicle 10 is reported stolen, the message may indicate that the vehicle 10 is stolen, thus allowing parties external to the vehicle to identify the vehicle 100 as such.

Alternatively, the message may be any suitable type of message and may be controlled by any suitable party, for example, an official organization (for example, the DMV), the driver of the vehicle 10, the owner of the vehicle 10, a third party unrelated to the vehicle 10, or any other suitable party. In a first example, the message may include additional details related to the vehicle 10, including the model of the vehicle 10, the smog check results of the vehicle 10, maintenance issues of vehicle 10, or any other suitable type of information related to the vehicle 10. In a second example, the message may include details related to the driver of the vehicle 10, including organizations that the driver supports or belongs to (for example, the Girl Scouts, the San Francisco Giants baseball team, or a political party), a cause that the driver supports (for example, People for the Ethical Treatment of Animals (PETA) or cancer awareness), the demographic of the driver, or any other suitable type of information related to the driver. In this second example, the message may also include official details regarding the driver; for example, the message may indicate that the driver is a doctor or a law enforcement officer, allowing people outside the vehicle 10 to direct requests to the driver when his services are desired. Official details may also include details relating to the driving history of the driver; for example, if the driver has an imperfect driving record, a notification may be rendered on the display in order to warn others in the vicinity of the vehicle. In a third example, the message may include notifications for drivers in the vicinity of the vehicle 10, for example, traffic information or weather forecasts. In a fourth example, the message may include details regarding the owner of the vehicle. This may be particularly useful when the vehicle 10 is a member of a fleet of cars, for example, a car rental agency, a moving truck rental agency, a government fleet, or any other suitable type of fleet. The message of the fourth example may indicate which fleet the vehicle 10 belongs to; this information may be used to identify vehicles, to advertise regarding the fleet (for example, if the vehicle 10 belongs to a rental car agency, the message may include an advertisement or a message for that particular rental car agency), or for any other suitable purpose. However, the message may be any other suitable type of message.

The display system 100 is preferably powered by a power source. The power source is preferably a power source of the vehicle 10, such as the accessories battery of the vehicle to, the engine of the vehicle to, or any other suitable power source of the vehicle 10. Alternatively, the display system 100 may include and be powered by a power source that is substantially independent from a power source of the vehicle 10. The power source of the display system 100 is preferably a battery, but may alternatively be a solar panel, wind generator, or any other suitable type of power source or combination of power sources. Yet alternatively, the display system 100 may include a power source that is rechargeable and coupled to a power source of the vehicle to that stores power from the vehicle 10 while the vehicle 10 is in operation and/or the ignition of the vehicle to is on. In this variation, the power source of the display system 100 allows for power generated while the vehicle is in operation to be used at a later time by the display system 100. However, the display system 100 may be powered using any other suitable method and/or arrangement.

The display 110 functions to display content, wherein content includes at least one of the identification information of the vehicle 10, registration information of the vehicle 10, and a message. The display 110 is operated by the processor 130 in one of the four operational modes. The display 110 is preferably of a substantially low power display, such as an LED display, an LCD display, an e-ink display, an organic LED display, an interferometric modulator display (iMoD), a display that uses electrophoretic deposition (EPD), a cholesteric liquid crystal display (ChLCDs), or any other suitable display. The display 110 may alternatively be a combination of the above display types. The display 110 preferably also has a substantially wide range of viewing angles. The display 110 is preferably also substantially thin, allowing the display 110 to replace existing license plates on the rear and/or front exterior of the vehicle. Similarly, the display 110 is preferably of a width, height, and/ or aspect ratio that is/are substantially similar to existing license plates. Alternatively, the display 110 may be substantially different than existing license plates (for example, in the case of the relatively narrow height of European license plates, the display 110 may be of a substantially different height). However the display 110 may be of any other suitable dimension.

The display 110 may also include a backlight. The backlight functions to control the light intensity of the information displayed by the display 110. The backlight preferably includes a plurality of degrees of light intensity. The processor 130 may select the degree of light intensity based upon the mode of operation. The processor 130 may also select the degree of light intensity based upon ambient light levels proximal to the display 110. For example, the degree of light intensity may be higher during the day and lower during the night. In this variation, the display system 100 also includes a light sensor to detect the level of ambient light. The degree of light intensity of the display system 100 may also be selected based on the preferences of the driver, a law enforcement officer, or any other suitable party. However, the degree of light intensity of the display system 100 may be selected based on any other suitable criteria. The backlight may be a set of lights located substantially on the perimeter of the display 110 and that are directed toward the display 110. Alternatively, the backlight may be located substantially behind the display 110 and provide light from behind the display 110. However, the backlight may be of any other suitable arrangement. The backlight may be a series of low-power light sources, such as LEDs, but may alternatively be any other type of light source. Alternatively, the display 110 may include a light-reflective surface that functions to illuminate the display 110 with reflected light. The light-reflective surface may be a mirror or any other suitable type of reflective material. The light-reflective surface may also be of a retroreflective material that reflects light back in the direction of the light source. The light-reflective surface may also be combined with a light source to more effectively illuminate the display 110, for example, the transflective materials used on freeway signs. However, any other suitable material or method may be used to illuminate the display.

The vehicle speed sensor 120 functions to detect the speed of the vehicle 10. The vehicle speed sensor 120 is preferably a sensor that measures the actual velocity and/or acceleration of the vehicle 10, such as an accelerometer coupled to the vehicle 10 or a tachometer coupled to the drivetrain of the vehicle 10 and which measures the number of revolutions of a drivetrain component, such as a wheel, for a period of time in order to determine the speed of the vehicle 10. In a second variation, the vehicle speed sensor 120 couples to the speedometer of the vehicle 100 and/or an onboard computer of the vehicle 100; in this configuration, the speed sensor 120 functions to transmit information gathered by the speedometer and/or the onboard computer to the processor 130, rather than measure the vehicle speed directly. However, the vehicle speed sensor 120 may be any other suitable type of sensor that determines the actual speed and/or acceleration of the vehicle 100. Alternatively, the vehicle speed sensor 120 may be a sensor that measures the relative velocity and/or acceleration of the vehicle, for example an ultrasonic sensor or an infrared sensor that determines the speed of the vehicle relative to another object. The other object may be a stationary portion of the road or a nearby vehicle. However, the vehicle speed sensor 120 may determine the speed of the vehicle 10 using any other suitable method or sensor type.

The processor 130 functions to render content on the display 110 in one of the first, second, or fourth operational modes based upon the speed and state of the vehicle 10, and the third operational mode whenever a trigger event is identified, such as when a trigger signal is sensed or the vehicle 10 enters a specified trigger location. The identification and/or registration information of the vehicle 10 is displayed in the first mode (shown in FIG. 1); identification and/or registration information of the vehicle 10 is displayed with a message in the second mode (shown in FIG. 2); the power consumption level of the display 110 is lower than at least one of the first and second operational modes in the fourth operational mode (shown in FIG. 4); and information regarding the vehicle to and/or driver of the vehicle to is displayed in the third operational mode when a trigger signal is detected and/or when a trigger event is identified (shown in FIG. 3). The processor 130 is preferably coupled to the vehicle speed sensor 120 and the trigger device 170, which determine the speed of the vehicle and identify trigger events, respectively; preferably, the processor will determine the operational mode of the display 110.

The processor 130 is preferably coupled to the vehicle speed sensor 120. As mentioned above, the speed determined by the vehicle speed sensor 120 may be the actual speed of the vehicle 10 or may alternatively be the speed of the vehicle 10 relative to another object (for example, a neighboring vehicle). The processor 130 preferably selects the operational mode of the display system 100 based on the speed and power state of the vehicle 10. However, a device other than the processor, such as the onboard computer of the vehicle 10, a law enforcement officer, a second processor connected to a remote server, or any other suitable device or institution may select the operational mode of the display system 100. The processor 130 preferably operates the display 110 in the first and second operational modes when the vehicle 10 is on, and the processor preferably operates the display 110 in the fourth operational mode when the vehicle 10 is off. The vehicle 10 is preferably considered "on" when the driver turns any portion of the vehicle 10 on. In many cars, there is a plurality of "on" states, for example, a first "on" state in which basic functionality, such as opening and closing windows, is allowed; a second "on" state in which more advanced and/ or higher-power functionality, such as ventilation systems or the sound system, is allowed; and a third "on" state in which the vehicle may be driven (or, in other words, the ignition is on). The vehicle 10 may be considered "off" otherwise. In the "off" state, certain portions of the vehicle may still be "on", for example, security sensors, key proximity sensors (such as keyless entry), or any other type of substantially-low-power functionality. Alternatively, the vehicle 10 may be considered "on" when the ignition is on and considered "off" when the ignition is off, regardless of any other functionality that the vehicle may provide to the driver. Yet alternatively, the vehicle 10 may be considered "on" when the presence of a person is detected within the vehicle and "off" when there is no one within the vehicle. The vehicle 10 may also be considered off when the emergency brake or transmission parking brake of the vehicle 10 is engaged, regardless of the state of the ignition or presence of a person within the vehicle 10. However, the vehicle may be considered " on" and "off" using any other suitable criteria. The processor 130 preferably operates the display 110 in the first operational mode when the vehicle 10 is at a first speed and preferably operates the display 110 in the second operational mode when the vehicle 10 is at a second speed lower than the first speed. The second speed is preferably substantially zero speed, or substantially close to zero speed. This allows for identification a n d /or registration information of the vehicle 10 to be substantially visible while the vehicle 10 is in motion (the first speed), as shown in FIG. 1. This allows any party external to the vehicle 10 to visually access the information rendered on the display 110 in a manner similar to that used to visually access information on a static (or stamped) license plate. In one variation, the processor 130 operates the display 110 in the second operational mode and renders the second content on the display 110 when the vehicle 10 is on and at the second speed, wherein the second speed is preferably zero speed or a substantially slow speed, such as when the vehicle is moving slowly through heavy traffic. Because the message depicted in the second mode takes up a portion of the display area of the display 110, the identification and/or registration information also depicted may consume a smaller portion of the display area in the second operational mode as compared to the first operational mode, as shown in FIG. 2. Because the identification and registration information is depicted in a smaller size on the display 110 when a message is displayed concurrently with the vehicle 10 information, the visibility of the identification and registration information may be less in the second operational mode than in the first operational mode. Alternatively, the identification and/or registration information rendered on the display 110 in the second operational mode may be of the same or similar format (for example, size and layout) as in the first mode, but the message may be rendered on the display 110 to overlap the identification and/or registration information. This may also result in reduced visibility of the identification and/or registration information of the vehicle 10. Therefore, the message may be displayed only under such conditions as when the vehicle is stopped or nearly stopped so that decreased visibility of the identification and/or registration information does not occur when the vehicle 10 is moving at a substantial speed; however, the additional functionality of displaying the message when the vehicle is at the second speed still remains. Additionally, the message may provide an undesired distraction for a party outside of the vehicle 10 while the vehicle 10 is in motion, and thus, by only displaying the message while the vehicle is stopped or nearly stopped, the possibility of distraction may be substantially reduced. However, the processor 130 may alternatively operate the display 110 in the first and second operational modes at any other suitable speed arrangement. In a variation of this, the display system 100 may enhance legibility of the information for a party outside of the vehicle 10 by horizontally mirroring content rendered on the display 110 when the display 110 is mounted on the front exterior of the vehicle 10; in this variation, content rendered on the display may be read in the correct orientation by a party viewing the display 110 in a rearview or side mirror of a second vehicle located ahead of the vehicle 10. However, the processor may render content on the display 110 by any other means or arrangement such that distraction caused by the display 110 is reduced and legibility of the displayed content is improved.

As described above, the processor 130 preferably functions to operate the display 110 in the fourth operational mode when the vehicle to is off. The fourth operational mode preferably displays identification and registration information of the vehicle to at a second power consumption level that is less than the first power consumption level. In a variation of this, a message is rendered on the display 110 in addition to the identification and registration information of the vehicle 10, although any one or combination of a message, identification information of the vehicle 10, registration information of vehicle to, or any other information may be rendered on the display 110 when in the fourth operational mode. When the vehicle 10 is off, the power available to the display system 100 may be less than when the vehicle is on. For example, in the variation wherein the display system 100 obtains power from a power source of the vehicle 10, the display system 100 may be utilizing energy that was stored from another period of time when the vehicle was on. Thus, there is a limited supply of power, and by operating the display 110 at a lower power consumption level in the fourth operational mode than in the first and/or second operational modes while the vehicle is off, the length of time that content may be rendered on the display 110 may be increased for a given amount of energy available to the display system 100. Alternatively, the fourth operational mode may function to turn off the electronic display 110 (e.g., a "sleep mode") until a trigger signal is detected to actuate the third mode.

The operation of the display 110 in the fourth operational mode may reduce the power consumption of the display system 100 in a variety of arrangements. In a first variation, the display 110 may be turned off at a first time and turned on at a second time. The display 110 may be timed to cycle on and off at specific time intervals, for example, every five minutes. The driver, the owner, or any other suitable party may adjust the intervals. This allows the display 110 to be turned off for a length of time and turned on for another length of time. The length of time that the display 110 is turned off is preferably substantially longer than the length of time that the display 110 is turned on, which substantially decreases the power consumption of the display 110. In a further variation, when in the fourth operational mode, content may be rendered on the display 110 in colors that require less power to display, as compared to when operating in the first operational mode. However, the processor may operate the display 110 by any other means that reduces power consumption of the display 110 when in the fourth operational mode, as compared to the first operational mode. Furthermore, the processor 130 may reduce the power consumption level of the processor 130 when in the fourth operational mode, for example, by reducing clock speed, shutting down auxiliary functions such as transmitting data to and/ or receiving data from the communications device 140, or any other method to reduce power consumption of the processor 130. When the processor 130 operates the display 110 in the fourth operational mode, the light intensity of the display 110 may be substantially identical to the light intensity of the first and/or the second operational modes. Alternatively, because the vehicle 10 is presumed to be stationary when off (a possible exception to this presumption would be when the vehicle 10 is being towed) and the party to which the message and/or identification information and/or registration information is to be shown is substantially proximal to the vehicle 10, the light intensity of the display 110 may be substantially less in the fourth operational mode than in the first and/or second operational modes. However, any other suitable light intensity may be used in the fourth operational mode.

In a second variation, the display 110 may be continuously on when operating in the fourth operational mode but at a substantially lower light intensity than in the first and/or second operational modes. In a first example, the backlight of the display 110 may be at the lowest light intensity in the third mode. In a second example, in the variation of the display 110 that is e-ink, the backlight of the display 110 may be turned off, allowing only the e-ink, which is bistable and does not require additional power to maintain, to be visible. The method and arrangement to decrease the power consumption of the display 110 in the fourth operational mode is preferably one of the two above variations, but may alternatively be a combination of the above variations or any other suitable method or arrangement.

Figure 4:
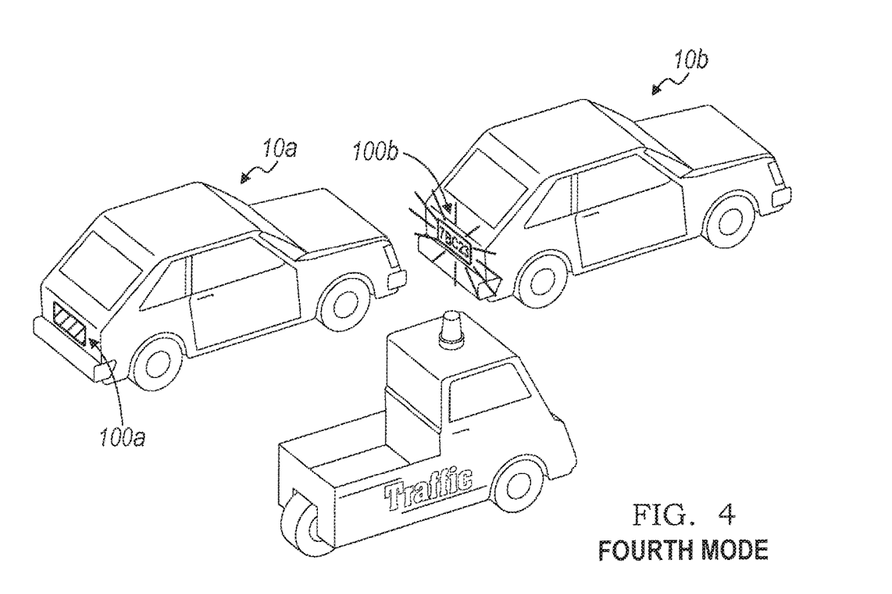
FIG. 4 is schematic representations of the display system operating in a fourth operational mode.
Figure 5:
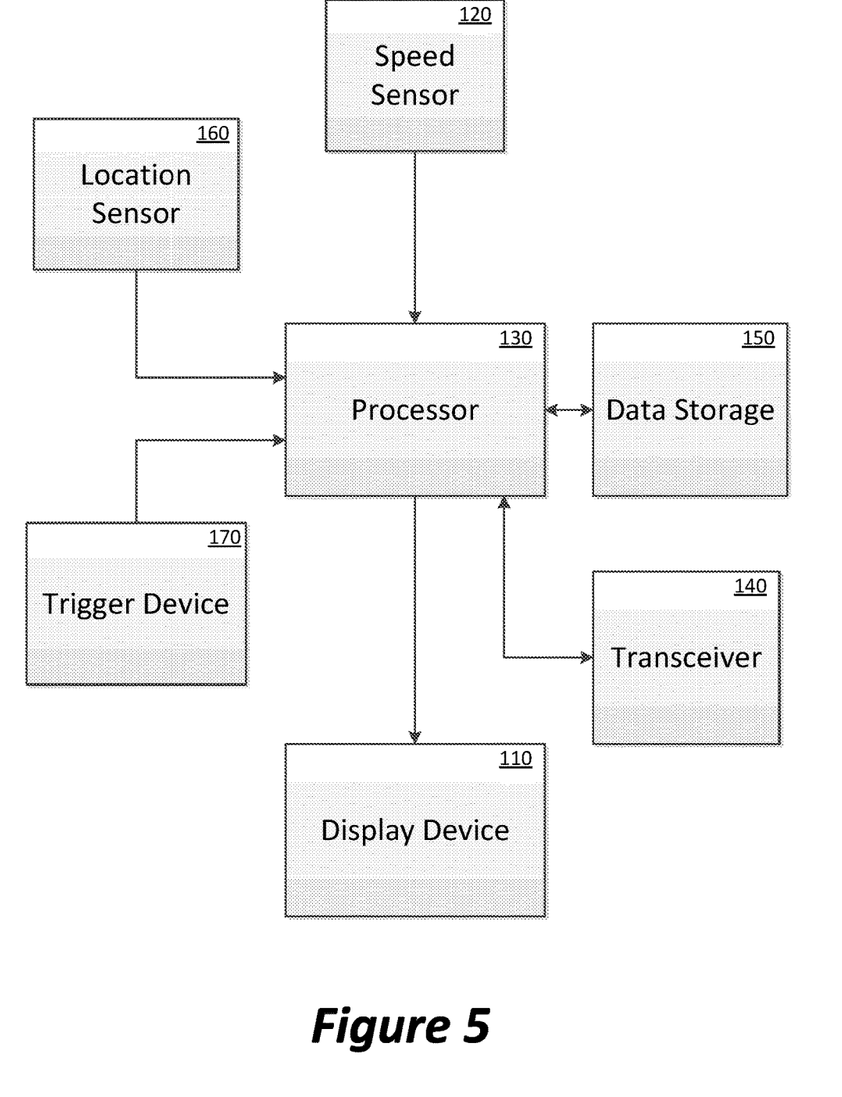
FIG. 5 is a schematic representation of an example processing system and the communication links therebetween.

The third mode functions to allow a trigger signal to actuate the display of information regarding the vehicle 10 and/or the driver of the vehicle 10 at any desired time. As described above, the processor 130 is preferably configured to transition into the third mode from any of the first, second, or fourth operational modes when a trigger signal is sensed and/or a trigger event is identified, but may alternatively transition into the third mode from one of or any combination of the first, second, or fourth operational modes. Also as described above, the information displayed in the third operational mode may be substantially similar or may be different from the information displayed in the first mode. The power consumption per unit of time of the electronic display system 100 in the third operational mode may be the same as either the first or the second modes, but may alternatively be less or more than the power consumption level of the first, second, or fourth operational modes. For example, the brightness intensity of the electronic display 110 in the third mode may be less than in the first or second modes. However, any other suitable power consumption level of the third operational mode may be used. In a first exemplary usage scenario, the third mode may be triggered at a tollbooth. In this example, the mechanism used for automatic toll collection services may be used to trigger the third mode, such as the RFID sensing system used with toll tags such as Fastrak or E-ZPass. The information rendered on the display 110 may be detected by a tollbooth worker or by a camera that may record the information for future use. In a second exemplary usage scenario, the third mode of a parked vehicle 10 may be triggered by a parking official, as shown in FIG. 4, to show the relevant registration information of the vehicle 10. In a third exemplary usage scenario, the third mode may indicate that the vehicle to is a stolen vehicle. In this third example, the third operational mode may be triggered remotely when the vehicle to is reported stolen and the third mode may be continuously actuated to display the stolen status of the vehicle, which may facilitate the recovery of the stolen vehicle 10. However, the third mode may be actuated and used in any other suitable usage scenario.

The trigger device 170 may be an active trigger device that is configured to determine when to trigger the third mode. In a first example, the trigger device 170 may function to communicate with the location sensor and determine to trigger the third mode when the vehicle 10 is detected to be substantially proximal to a particular location (for example, where traffic cameras are located, thus facilitating the traffic cameras in recording the desired official registration information). In this variation, the trigger device may interact with a location trigger database, wherein the location trigger database includes at least one specified location in which the third mode is to be triggered when the vehicle 100 is substantially proximal to the specified location. For example, a store with a high incidence of theft may be included in the location trigger database, and the trigger device may identify a trigger event and thus trigger the third mode when the vehicle 10 is substantially proximal to or within the parking area of the store, thus facilitating the recording of vehicle information by surveillance cameras on the store property. In a second example of the active trigger device 170, the trigger device 170 may function to determine to trigger the third mode at a particular time, for example, the time a patrol officer is scheduled to be within an area, thus allowing the patrol officer to view registration information. In a third example, the trigger device 170 may function to determine to trigger the third mode when the vehicle to is at a certain speed. For example, if the speed limit of the road is 65 miles per hour and the vehicle to is traveling at 75 miles per hour, the third mode may be triggered to indicate that the vehicle 10 is above the speed limit, thus facilitating traffic officials in determining vehicles traveling above the speed limit. However, any other suitable type of active trigger device may be used.

Alternatively, the trigger device 170 may be a passive trigger device that detects the presence of a trigger signal and, upon detection of the trigger signal, activates the third mode. For example, the trigger device 170 may detect the output of a radar speed gun or a LIDAR speed gun used by a law enforcement official, and the display system may enter the third operational mode upon identifying this as a trigger event. Alternatively, the trigger device 170 may sense a wired trigger signal. For example, the electronic display system 100 may include an interface, such as a keypad or a button, that allows a law enforcement official to input a trigger signal through the interface to actuate the third mode. In the variation of the interface that is a keypad, the law enforcement official may input a unique code to actuate the third mode, thus allowing only those with the unique code to access the information to be displayed in the third mode. This may be particularly useful in variations of the third mode that display more information, such as personal information regarding the driver of the vehicle 10 that only official personnel are to access. However, any suitable type of wired trigger signal may be used and detected. In a second variation, the trigger device 170 may sense a wireless trigger signal, such as an infrared signal, radar signal, ultrasound signal, Wi-Fi signal, Bluetooth signal, cellular signal, satellite signal, radio signal, or any other suitable type of wireless signal. In usage scenarios where the trigger signal is transmitted from substantially proximal to the vehicle 10 (for example, by a law enforcement officer that is passing by the vehicle 10), a substantially short-range signal such as infrared, radar, or ultrasound may be used. In usage scenarios where the trigger signal may be transmitted from any suitable distance (for example, a signal to locate a stolen vehicle that may be located in any location), a substantially long-range signal such as cellular or satellite may be used. Because there may be more than one frequency of any particular type of wireless signal in the air at one time, the trigger signal is preferably of a unique wireless signal (for example, one that is assigned only to a law enforcement official or an official facility such as certain Ultra High Frequencies (UHF) or Very High Frequencies (VHF)) that is detected by the trigger device 170 and recognized as a frequency or signal type that actuates the third mode. This may decrease the chance of the electronic display system 100 detecting a signal and misinterpreting the signal as a trigger signal. Alternatively, the trigger signal may be encrypted to allow for verification of source. For example, the trigger signal must include a certain type of encryption key in order to trigger the third mode. In this variation, cryptographic protocols such as Diffie-Hellman key exchange, Wireless Transport Layer Security (WTLS), or any other suitable type of protocol may be used. The trigger signal encryption may also comply with standards such as the Data Encryption Standard (DES), Triple Data Encryption Standard (3-DES), or Advanced Encryption Standard (AES). However, any other suitable type of wireless trigger signal may be used.

Alternatively, the trigger device 170 may be a combination of both an active and a passive trigger device. The trigger device 170 of this variation may function to passively detect a trigger signal, but, upon identification of the trigger signal as a trigger event, may also function to determine whether to activate the third operational mode. In a first example, the trigger device 170 may detect the presence of a trigger signal and actuate the third mode. The trigger device 170 then detects that the trigger signal is present for an extended period of time (for example, a continuous transmission of the trigger signal from a law enforcement official vehicle that is parked next to the vehicle 10), and determine to deactivate the third mode to decrease the power consumption of the electronic display 100. In a second example, the trigger device 170 may detect a trigger signal and only actuate the third mode if the trigger signal is detected at a particular location. This may be useful in implementing security for the potentially personal information that may be displayed in the third mode. In particular, third parties that desire to obtain the information for unofficial use may obtain the unique frequency of the trigger signal and may send out the trigger signal at a location along the road to obtain the personal information displayed in the third mode as vehicles pass by. To substantially prevent this, the trigger device 170 may be configured to activate the third mode only at locations that are monitored by law enforcement. In a third example, the trigger device 170 may function to only activate the third mode at certain time intervals. For example, a vehicle 10 may be parked at a two-hour parking spot. When the trigger device 170 first detects the presence of a trigger signal (for example, from a traffic official), the third mode is activated for a first time after the vehicle to has been parked. The trigger device may then start counting a time interval of two hours and only allow the fourth mode to be reactivated after the two hours have past. This allows a traffic official to drive past a series of parked cars (shown in FIG. 4), and only those vehicles (shown as vehicle 10b in FIG. 4) that have been parked past the time limit of two hours will activate the third mode and display the official registration information, indicating to the traffic official that the vehicle 10 has been parked in the parking spot for over two hours. This may facilitate the traffic official in determining which vehicles have parked past the time limit in a potentially more efficient fashion. In this example, the traffic official may instruct the trigger device 170 regarding the time limit for parking through the trigger signal. Alternatively, the trigger device 170 may detect the location of the vehicle to and determine the time limit based upon the location of the vehicle 10. However, any other suitable type of combined active and passive trigger device may be used.

The third mode may display information regarding the vehicle 100 for a predetermined period of time once a trigger event is identified, for example, five minutes. Alternatively, the third mode may display the identification and registration information of the vehicle 10 for as long as a trigger signal is present, for example, for as long as the wireless signal from a parking official is within a certain vicinity of the electronic display system 100. Yet alternatively, the third mode may display identification and registration information of the vehicle 10 once a trigger signal is sensed and until a deactivation signal is sensed, for example, in the variation of the trigger device 170 that includes an interface, the law enforcement official may activate the third operational mode by pushing a first button (or combination of buttons) and deactivate the third operational mode by pushing a second button (or combination of buttons). However, the third mode may function to display identification and registration information of the vehicle 100 for any other suitable duration of time.

The communication device 140 functions to allow information or data to be transferred to and from the electronic display system 100. The communication may be conducted with an official organization (such as the DMV or a law enforcement agency), a database of messages, the driver of the vehicle, the owner of the vehicle, or any other suitable party. The communication may also be conducted with a server, such as what is commonly referred to as a "cloud" or any other suitable type of server arrangement. The communication may include information regarding vehicle identification and/or registration information, vehicle maintenance information, driver information, vehicle location information (for example, in the variation of the electronic display system 100 that includes a GPS location device or accesses GPS location services), updated advertisements, or any other suitable type of information. The communication device 140 is preferably of a wireless communication device, for example, one that communicates with cellular phone towers, WiFi hubs, or any other suitable type of wireless communication. As described above, the communication device 140 may also include the trigger device 170. In this variation, the communication device 140 may also function as the trigger device 170 to detect a trigger signal and identify the trigger signal as a trigger event. Alternatively, the communication device 140 may communicate with the trigger device 170. For example, the communication device may receive communication from a law enforcement agency to trigger the third operational mode and may then communicate with the trigger device 170 to activate the third mode. This may be particularly useful in variations of the electronic display system 100 where the trigger device 170 is a short range signal detector and the communication device 140 is a long range signal detector. However, the communication device 140 may also be a wired communication device. Alternatively, the trigger device may detect the trigger signal and identify a trigger event by any other method, and the trigger device 170 may supply any other information to the processor 130 pertaining to the identification of the trigger event.

The communication device 140 functions to allow content, information, and/or data to be transferred to and from the display system 100. The communication may be conducted with an official organization (such as a DMV office or a law enforcement agency), a content database, the driver of the vehicle, the owner of the vehicle, or any other suitable party. The communication device may transmit and/or receive information regarding vehicle identification and/or registration information, vehicle maintenance information, driver information, vehicle location information (for example, in the variation of the display system 100 that includes a GPS location device or accesses GPS location services), updated advertisements, or any other suitable type of information. The communication device 140 is preferably of a wireless communication type, for example, one that communicates with cellular phone towers, Wi-Fi hubs, or any other suitable type of wireless communication. However, the communication device 140 may be a wired communication device. In this variation, updated information is transferred when the display system 100 is "plugged in" to an updating device, for example, a computer at a maintenance facility, at a DMV office, or any other suitable location, or another vehicle and/or display system 100 that has wireless communication capabilities. The communication device 140 may also include a communication processor that functions to interpret communications to and/or from the display system 100. The communication processor is preferably separate from the processor 130, but may alternatively be the processor 130. The communication processor may function to encrypt and/or decrypt communications to and/or from the display system 100. The encryption/decryption may be any one of a variety of authentication and encryption schema. For example, cryptographic protocols such as Diffie-Hellman key exchange, Wireless Transport Layer Security (WTLS), or any other suitable type of protocol. The communication processor may also function to encrypt data to encryption standards such as the Data Encryption Standard (DES), Triple Data Encryption Standard (3-DES), or Advanced Encryption Standard (AES). However, the communication device 140 may allow any other suitable type of communication and may be of any other suitable arrangement.

The communication device 140 may receive content, information, and/or data from a content database. Preferably, the content database is arranged substantially remote from the processor 130. The content database also preferably contains content provided by an institution, for example, an advertiser, a school, a record company, or a sports team or venue; content provided by the institution preferably includes advertisements. Alternatively, the content database may contain content provided by the driver and/or owner of the vehicle 10, for example, a message composed by the owner of the vehicle 10 congratulating a child upon graduation from high school. However, any other suitable party may provide content to the content database, and the content database may include a combination of advertisements from one or more institutions and personal messages from one or more individuals. In a first example, content on the content database is accessed by the processor 130 via the communication device 140 and stored on the storage device 150. Preferably, the storage device 150 is arranged substantially proximal to the display 110, such as within the vehicle 10 or within a housing containing the display 110; however, the storage device 150 may be located remotely from the vehicle 10, such as on a hard drive connected to a remote server. In a second example, content on the content database is accessed via the communication device 140 in real time and then rendered on the display 110, thereby bypassing storage of content on the storage device 150. However, content from the remote message database may be accessed by any other means before being rendered on the display 110. In a third example, the storage device also functions as the content database, wherein content from at least one institution or individual, such as those listed above, may be stored on the storage device and also selected by the driver and/or owner of the of vehicle 10 to be rendered on the display 110. In this variation, the storage device 150 of the display system 100, also functioning as a content database, may be accessed by a second display system separate from the display system 100, such as a display system arranged on a second vehicle. However, any other suitable party may select the content to be rendered on the display 110 from the content database. Furthermore, content on the content database may be selected, accessed and/or modified by the driver and/or owner of the vehicle 10, or any other suitable party, via an interface. Preferably, the interface is internet-based and accessible via a web browser, for example, on a mobile smart phone or on a computer. In a first example, the driver and/or owner of the vehicle 10 may access the interface with an internet-capable mobile phone, then log into the content database and select content (for example, a San Francisco Giants Baseball banner) he wishes to be rendered on the display 110. In a second example, the content database stores vehicle registration information, and upon the renewal of the registration of the vehicle 10, a DMV representative may access the content database via a computer equipped with the interface and then update the registration information of the vehicle 10 on the content database; the communication device 140 may then retrieve the updated registration information from the content database and the registration information subsequently rendered on the display 110 may reflect the renewal. Alternatively, the interface may b e a handheld device that i s hardwired, or physically "plugged in", to the display system 100. In this variation, the interface may or may not be removable from the display system 100. Furthermore, the interface may not couple to the content database via the communication device 140, but instead only provide the driver and/or owner of the vehicle 10, or any other suitable party, to access content already located on the display system 100, such as on the storage device 150 arranged substantially proximal to the display 110. For example, a law enforcement officer, upon pulling over the driver of the vehicle 10 for a traffic violation, may hook up to the display system 100 arranged on the vehicle 10 a device equipped with the interface, wherein the interface provides access to the current identification and/ or registration information of the vehicle 10. However, the interface may permit access to any content contained in any other device coupled to the display system 110 and by any other means.

The communication device 140 may transmit data regarding the rendering of a particular content on the display 110. Preferably, an advertisement is included in the content rendered on the display 110, and the communication device 140 transmits data regarding the rendering of the advertisement on the display 110. This data may include, for example, how long the advertisement was displayed, when it was displayed, and where it was displayed. Alternatively, this data could be collected and/or stored by the processor 130, although it could be collected and stored by any other device or means. Preferably, this information is used to determine the magnitude or type of an award granted to the driver and/or owner of the vehicle 10. In a first example, if an advertisement for tickets to a baseball game featuring a given team is rendered on the display 110, the driver and/or owner of the vehicle 10 may receive a monetary award commensurate with the length of time that the advertisement was rendered on the display 110; alternatively, the owner and/or driver of the vehicle 10 may receive one or more tickets to a baseball game featuring this team in return for displaying the advertisement in an area with a relatively low attendance at baseball games. However, any other method may be used to grant an award of any other type to the driver and/or owner of the vehicle to in return for the rendering of content on the display 110.

As a person skilled in the art will recognize from the previous detailed description and from the figures and claims, modifications and changes can be made to the preferred embodiments of the invention without departing from the scope of this invention as defined in the following claims.

We claim:

1. A method of rendering content on the exterior of a vehicle, the method comprising the steps of:
   providing a display configured to mount on the front or back exterior of the vehicle in a location configured for a license plate;
   obtaining vehicle registration and/or identification information from a government agency, said vehicle registration and/or identification information being unique to said vehicle;
   storing the vehicle registration and/or identification information in a storage device located on the vehicle;
   rendering a first content on the display when the vehicle is on and in motion, said first content including the vehicle registration and/or identification information stored in the storage device; and
   rendering a second content on the display when the vehicle is stopped, said second content including said vehicle registration and/or identification information of said first content, and said second content also including a message that is not related to said vehicle registration and/or identification information, wherein the first content does not include the message.

2. The method of claim 1, further comprising the steps of:
   monitoring a power state of the vehicle;
   reducing a power consumption level of the display when the vehicle transitions from an on state to an off state; and
   modifying content rendered on the display when the vehicle transitions from the on state to the off state.

3. The method of claim 1, further comprising the step of modifying content rendered on the display based upon the location of the vehicle.

4. The method of claim 1, wherein the message is an advertisement.

5. The method of claim 1, further comprising the steps of:
   receiving an input from a user; and
   modifying content rendered on the display based upon the input.

6. The method of claim 1, further comprising the steps of:
   arranging the display on the front exterior of the vehicle; and
   horizontally mirroring content rendered on the display.

7. The method of claim 1, wherein in displaying said second content, said message is displayed more prominently than said vehicle registration and/or identification information.

8. The method of claim 1, wherein in displaying said second content, said message is displayed in a center of said display, wherein said vehicle registration and/or identification information is displayed toward a corner of said display.

9. A display system for rendering content on the exterior of a vehicle, the system comprising:
   a display configured to mount on the front or back exterior of the vehicle in a location configured for a license plate;
   a vehicle speed sensor that detects the speed of the vehicle;
   a storage device configured to store vehicle registration and/or identification information from a government agency, said vehicle registration and/or identification information being unique to said vehicle;
   a processor connected to the speed sensor, the display, and the storage device and configured to implement one of the following operational modes of the display system based upon the speed of the vehicle:
      a first operational mode when the vehicle is in motion, in which case the processor drives the display to display a first content including said vehicle registration and/or identification information; and
      a second operational mode when the vehicle is stopped, in which case the processor drives the display to display a second content including said vehicle registration and/or identification information of said first content, said second content also including a message that is not related to said vehicle registration and/or identification information; wherein the first content does not include the message.

10. The display system of claim 9, wherein in displaying said second content, said message is displayed more prominently than said vehicle registration and/or identification information.

11. The display system of claim 9, wherein in displaying said second content, said message is displayed in a center of said display, wherein said vehicle registration and/or identification information is displayed toward a corner of said display.

12. A method of rendering content on the exterior of a vehicle, the method comprising the steps of:
   providing a display configured to mount on the front or back exterior of the vehicle in a location configured for a license plate;
   obtaining vehicle registration and/or identification information from a government agency, said vehicle registration and/or identification information being unique to said vehicle;
   storing the vehicle registration and/or identification information in a storage device located on the vehicle;
   rendering a first content on the display when the vehicle is on and in motion, said first content including the vehicle registration and/or identification information stored in the storage device such that said vehicle registration and/or identification information is displayed prominently on said display; and:
   rendering a second content on the display when the vehicle is stopped, said second content including said vehicle registration and/or identification information of said first content, and said second content also including a message that is not related to said vehicle registration and/or identification information, wherein the message is displayed more prominently on said display than the vehicle registration and/or identification information.

13. A display system for rendering content on the exterior of a vehicle, the system comprising:
   a display configured to mount on the front or back exterior of the vehicle in a location configured for a license plate;
   a vehicle speed sensor that detects the speed of the vehicle;
   a storage device configured to store vehicle registration and/or identification information from a government agency, said vehicle registration and/or identification information being unique to said vehicle;
   a processor connected to the speed sensor, the display, and the storage device and configured to implement one of the following operational modes of the display system based upon the speed of the vehicle:
      a first operational mode when the vehicle is in motion, in which case the processor drives the display to display a first content including said vehicle registration and/or identification information such that said vehicle registration and/or identification information is displayed prominently on said display, and a second operational mode when the vehicle is stopped, in which case the processor drives the display to display a second content including said vehicle registration and/or identification information of said first content, said second content also including a message that is not related to said vehicle registration and/or identification information, wherein the message is displayed more prominently on said display than the vehicle registration and/or identification.

\* \* \* \* \*